June 11, 1935. C. B. GRADY 2,004,108
GAS TREATING APPARATUS
Filed Aug. 24, 1932
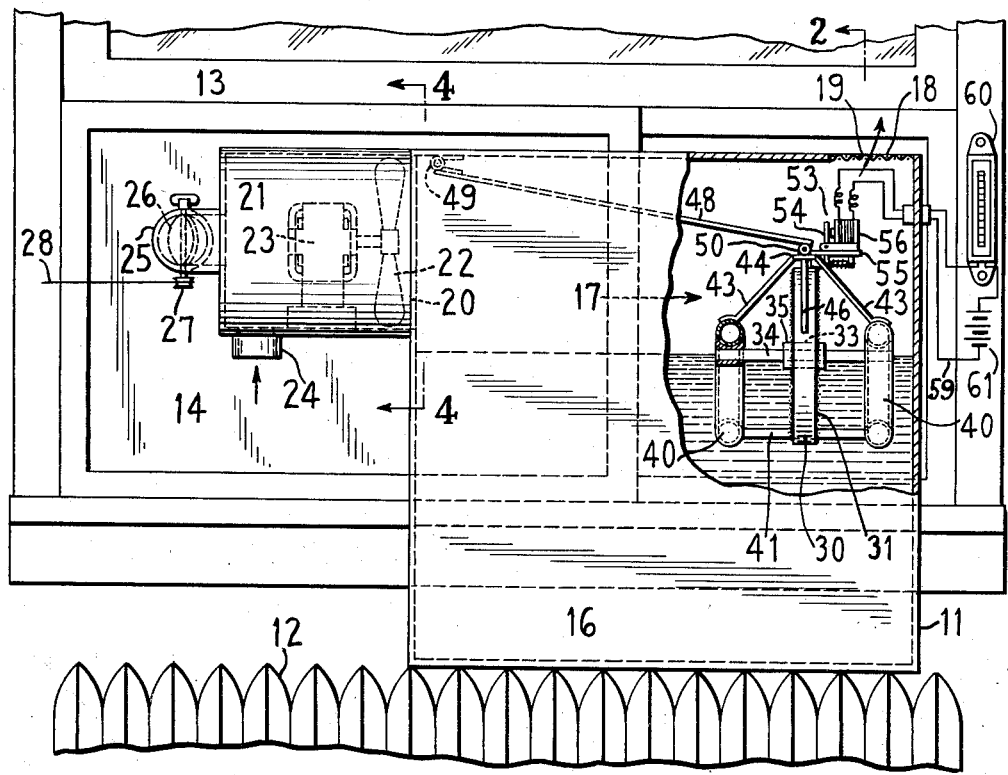

Patented June 11, 1935

2,004,108

UNITED STATES PATENT OFFICE 2,004,108

GAS TREATING APPARATUS

Charles B. Grady, West Orange, N. J.

Application August 24, 1932, Serial No. 630,175

7 Claims. (Cl. 261—92)

This invention is a novel gas treating apparatus, typically represented by the conditioning of air or other gases by water or other liquids, and adapted for various fields of use, such as household or industrial use.

The invention deals with the treatment of any gas by any liquid, and may be considered in its reverse aspect since, in some cases, a change in the liquid may occur such as enriching it by materials removed from the gases. The general object of the invention is to provide a gas treating apparatus of substantial efficiency and convenience of operation and control. A further object is to provide such an apparatus which will be inexpensive of construction and reliable in use. The utility may relate to the cleaning of gases, for example by removing dust or other solids and soluble gases or fumes, from air or from furnace gases or the like. The invention is also useful for humidifying or moistening gas or air, as for ventilation in dwellings, in which case the treatment of air is by water. The improvement may also be used for the cooling of air or gases, or by suitable provision for liquid heating, it may be used for the warming of gases, for example for warming air in dwellings in the cold season, under thermostat control. By providing a suitable agent the apparatus also may be used for distributing medication, in the form of vapor, for example by feeding pine needle oil to the liquid by which the gas or air is treated.

Other and further objects and advantages of the invention will be explained in the hereinafter following description of an illustrative embodiment thereof or will be understood to those conversant with the subject. To the attainment of such objects and advantages the invention consists in the novel gas treating apparatus and the novel features of combination, arrangement and construction herein illustrated or described.

In the accompanying drawing Figure 1 may be described as a front elevation of an apparatus embodying the present invention, the same partly broken away to show interior construction.

Fig. 2 is a right hand elevation and section of the apparatus taken on the line 2—2 of Fig. 1.

Fig. 3 is a top plan view with a showing of the interior parts by successive breaking away of the enclosing parts.

Fig. 4 is a right hand elevation and section taken on the line 4—4 of Fig. 1.

Fig. 5 is a detail front elevation and section taken on the line 5—5 of Fig. 3.

It is already known to provide a walled enclosure for gas treating purposes, with a liquid vessel in the lower part and a gas passage in the upper part of the enclosure and a device or fan for maintaining gas flow into and through the passage above the liquid and thence to discharge; the novelty of the present invention lying partly in the means for bringing about intimate contact between the flowing gases and the treating liquid, and in other features as described. The invention is herein shown as embodied in an apparatus for the treatment of air by water to condition the air for supply to the rooms of dwellings, offices and the like, it being understood that the same principles can be otherwise used, for example for conditioning air in closed automobiles or other vehicles during travel thereof. The drawings indicate an enclosure or box 11 resting for example upon a shelf or radiator 12 adjacent to a window, of which the sash 13 is shown raised and the space under the sash closed by a fiber or other window board 14 apertured for the intake 25 to be described.

The enclosure 11 embodies a liquid vessel 16 in its lower part, liquid being shown occupying the vessel substantially to its maximum level, and above the liquid a gas passage, flue or space 17 through which air or gas flows in the direction of the arrow to be discharged at an outlet 18 shown protectively covered by a guard or netting 19, by which the conditioned air is discharged into the room, or from which the treated gas may be delivered as desired. At its end opposite to the outlet the gas passage has an inlet 20 leading from an inlet chamber 21 in which may be accommodated a fan 22 for maintaining gas flow, the fan shown as an ordinary ventilating fan driven by a motor 23, which may have the usual speed control. The fan chamber 21 is shown as having a first intake 24 by which air may be drawn from the same room into which the discharge delivers, thus affording recirculation; and there is shown a second or exterior intake 25 illustrated as a bent pipe extended through the window board 14 and having a damper 26 to regulate the proportion or amount of outside air to be drawn in and forced through the treating apparatus.

The outside air damper 26 may be regulated manually or automatically to vary the total amount of outside air, or the proportions of outside air and recirculated inside air. There is shown a pulley 27 attached to the spindle of the damper and a cord 28 which may be pulled to cause the wide opening of the damper. This is merely a diagrammatic illustration. The cord 28 may be arranged to be pulled under the automatic control of a carbon monoxide or carbon dioxide indicator, of well-known character, in such way that upon an excess of carbon monoxide or carbon dioxide or both, the damper will be opened widely to increase the quantity or proportion of outside air admitted to the treating apparatus.

It is a feature of this invention to provide a partially immersed circular disk or screen 30 of pervious material such as wire mesh which is adapted to rotate in a plane transverse to the direction of the gas or air flow through it. Thus the rotary disk or screen member 30 is shown as circular in outline with preferably a plurality of pervious or reticulated transverse walls 31 and a closed periphery or rim 32, the entire device being like a wheel having a hub 33 turning loosely on an axle 34 which is provided with collars 35 to position the disk. The axle 34 is mounted to extend in the same longitudinal direction as the gas flow through the gas passage 17, the disk thereby rotating in a transverse plane.

While the disk or screen 30 may be rotated or driven positively by any suitable connections, with variable drive speed, under suitable regulation, it is herein shown as being caused to rotate by reason of the flow of gas through it, the disk for this purpose being formed with vanes 37, preferably interior of its side walls 31, reacting with the air flow to rotate the disk; and the vanes as they pass below the surface of the water tend to cause a circulation of the water in a direction opposite to the advancing flow of gas.

While the rotary disk 30 and its axle 34 may be mounted in a fixed position, if means are provided to maintain the proper water level, a preferable arrangement is herein disclosed wherein the rotary disk is bodily mounted on a pontoon 40 floating on the water surface, so that the entirety is movable and adjusts itself to the level of the water, thus insuring the proper immersion of the disk. The pontoon or float is shown as built up of the two hollow side portions 40 with rigid connections from one to the other consisting of the axle 34 and a pair of lower braces 41. Bridging over the top of the disk are a pair of inclined braces 43 extending from the tops of the pontoon sides to a transverse top piece 44, all part of the rigid structure of the pontoon. The liquid vessel 16 is quite deep so as to maintain a substantial volume of water, sufficient to last for a considerable period; and as the water is used up by evaporation the pontoon and its carried pervious disk may descend, thus preserving the proper relation of the parts.

To compel the advancing gas or air to traverse the pervious sides of the rotary disk the following supplemental arrangements are shown. The rim of the disk being circular, there is shown a curved vertical plate 46 extending downwardly below the transverse piece 44 and substantially conforming to the curvature of the disk, as best seen in Fig. 2. The closure is completed by a movable wall 48 bounding the top of the gas passage and having its far end pivotally connected as by a hinge 49 to a fixed part of the enclosure, the free or swinging end of the wall 48 having a pivotal connection 50 to the transverse piece 44. By this arrangement the air forwarded by the fan 22 is compelled to flow under the wall 48 and thence through the pervious sides of the disk 30, and thence to the discharge outlet 18. The wall 48 may be rigid or flexible and its free end may be considered as resting upon and supported by the pontoon as the latter lowers and rises with changes of water level.

The action of the pervious disk or screen 30 is that as it rotates each portion of each transverse wall 31 enters the liquid, thus discharging any accumulated solids, and then rises above the liquid into the air passage, carrying with it small drops of water or wet surfaces which, as they rise come into a position occupying the gas passage, so that the gas or air has to force its way through the pervious sides and thus effect intimate contact with the carried or suspended water or other liquid. The forced circulation of air thus causes the washing of the air, and the other treatments mentioned, the rotation of the disk constantly refreshing and wetting the surface or mesh through which the gas or air flows for its treatment; at the same time any dust or solids carried in the air are caught and deposited on the disk, and thereupon are promptly brought down below the surface of the liquid and removed by the circulation of the liquid, such impurities gradually accumulating as sludge in the lower part of the vessel, to be removed either progressively by an underneath tap or at intervals by washing out of the entire apparatus.

In order to give some regulation of the action of the device I have diagrammatically indicated a control of the rotation of the disk, for example by stopping and releasing the rotation according to conditions. Thus there is shown a wedge-like brake member 53 mounted on a lever 54 pivoted on an extension 55 of the cross piece 44, the upper end of the lever constituting an armature adapted to be pulled by an electromagnet 56 to apply the brake, while a spring 57 tends to restore the lever into retracted position against a stop rod 58. A circuit 59 leads to a hygrostat 60 in circuit with a source 61 of electric power, operating in a well-known way so that when humidity becomes excessive a circuit will be closed, energize the magnet and apply the brake, thus stopping the rotation of the disk and preventing the humidifying of the gas or air until conditions are restored and the brake is again released. The hygrostat may also control the action by varying the speed of the regulable fan or by changing the adjustment of dampers.

The described arrangement may be employed to reduce excess humidity, namely by chilling or refrigerating the contained water and thereby the pervious disk. By this the humid air passing through the disk and over the water will deposit moisture and thus gradually dehumidify the atmosphere, while the water level and pontoon rise.

There has thus been described a gas heating apparatus embodying the principles of the present invention; and since many matters of combination, arrangement and construction may be variously modified without departing from the principles, it is not intended to limit the invention to such matters except to the extent set forth in the appended claims.

What is claimed is:

1. Apparatus for treating air or other gases by water or other liquids, of the kind comprising a walled enclosure with a liquid vessel in its lower part, a gas passage in its upper part, above the liquid, and a device or fan for maintaining gas flow into, through and from the gas passage, such apparatus characterized by the combination with said elements of a partially immersed circular screen or disk of pervious construction, a pontoon floating in such vessel and upon which such screen is rotarily mounted and which maintains it in its partially immersed position with changes of liquid level, means for causing rotation of such screen so that each part of its surface is alternately dipped into the liquid and elevated to occupy the gas passage and compel the gas to flow through it, and a movable wall closing the gas passage space above the rotary screen and adjustable with changes of level of the pontoon.

2. Apparatus as in claim 1, and wherein the pontoon comprises spaced apart floats and frame members connecting them and supporting the rotary screen.

3. Apparatus as in claim 1, and wherein the pontoon carries a wall above and shaped to the disk and substantially meeting said movable wall.

4. Apparatus as in claim 1, and wherein the rotary screen comprises a plurality of pervious annular disks spaced apart.

5. Apparatus as in claim 1, and wherein the rotary screen turns in a longitudinal frame member of the pontoon as an axle.

6. Apparatus as in claim 1, and wherein the movable wall above the rotary screen is hinged at one longitudinal end to the gas passage wall and at its free end is connected to the pontoon.

7. Apparatus for treating air by water, of the kind comprising a walled enclosure with a water vessel in its lower part, an air passage in its upper part, above the water, and a device or fan for maintaining air flow into, through and from the air passage, such apparatus characterized by the combination with said elements of a partially immersed circular screen or disk of pervious construction occupying such passage and adapted to rotate in a plane transverse to the direction of air flow through it, means operated by the air flow for causing rotation of such screen so that each part of its surface is alternately dipped into the water and elevated to occupy the air passage and compel the air to flow through it, means for regulating such rotation of the screen, and a hygrostat connected to operate the regulating means to restrict the action upon excess humidity and vice versa.

CHARLES B. GRADY.